US010700537B2

(12) United States Patent
Abehasera

(10) Patent No.: US 10,700,537 B2
(45) Date of Patent: Jun. 30, 2020

(54) POWER ADAPTER

(71) Applicant: Bonalogic, LLC, Hallandale Beach, FL (US)

(72) Inventor: Benyamin Abehasera, Hallandale Beach, FL (US)

(73) Assignee: Bonalogic, LLC, Hallandale Beach, FL (US)

( * ) Notice: Subject to any disclaimer, the term of this patent is extended or adjusted under 35 U.S.C. 154(b) by 0 days.

(21) Appl. No.: 16/188,936

(22) Filed: Nov. 13, 2018

(65) Prior Publication Data

US 2020/0153258 A1 May 14, 2020

(51) Int. Cl.
*H02J 7/00* (2006.01)
*H02J 7/14* (2006.01)
*H01R 31/06* (2006.01)
*H02J 7/34* (2006.01)

(52) U.S. Cl.
CPC ........... *H02J 7/0042* (2013.01); *H01R 31/06* (2013.01); *H02J 7/007* (2013.01); *H02J 7/342* (2020.01); *H02J 2207/30* (2020.01)

(58) Field of Classification Search
CPC ........ H02J 7/0042; H02J 7/0054; H02J 7/007; H02J 2007/006; H01R 31/06
USPC .......................... 320/103, 107, 108, 114, 115
See application file for complete search history.

(56) References Cited

U.S. PATENT DOCUMENTS

| | | | | | |
|---|---|---|---|---|---|
| 5,977,747 | A | * | 11/1999 | Huang | H02J 9/061 320/107 |
| 6,501,246 | B2 | * | 12/2002 | You | H01M 2/1055 320/114 |
| 6,709,784 | B2 | * | 3/2004 | Resch | H01M 6/5033 429/123 |
| 10,111,470 | B2 | * | 10/2018 | Monsees | H05B 3/04 |
| 10,141,761 | B2 | * | 11/2018 | Hoter-Ishay | H01M 2/1061 |
| 2003/0087676 | A1 | * | 5/2003 | Lloyd | H04B 1/3883 455/569.1 |
| 2006/0202658 | A1 | * | 9/2006 | Andresen | H01M 2/1022 320/103 |
| 2008/0166968 | A1 | * | 7/2008 | Tang | H04W 99/00 455/41.2 |
| 2013/0320913 | A1 | * | 12/2013 | Chen | G06F 1/226 320/103 |
| 2014/0159645 | A1 | * | 6/2014 | Wyskiel | H02J 7/0055 320/107 |
| 2014/0274208 | A1 | * | 9/2014 | Baschnagel | H02J 7/0044 455/557 |
| 2014/0299372 | A1 | * | 10/2014 | Meazell | G06F 1/263 174/74 R |
| 2016/0099594 | A1 | * | 4/2016 | Kim | H02J 7/0047 320/134 |

(Continued)

*Primary Examiner* — Alexis B Pacheco
(74) *Attorney, Agent, or Firm* — Berger Singerman LLP; Geoffrey Lottenberg

(57) ABSTRACT

A power adapter has a main body, a first bus connector, and a second bus connector. The bus connectors are coupled to each other by an integrated circuit. The power adapter draws current from a first power source, such as a smartphone, to a second power source, such as an electronic cigarette. The power adapter snaps into a keyring receptacle for easy use and transportation. The receptacle has a hinged retention member for retaining spare electronic smoking device cartridges or other items.

4 Claims, 2 Drawing Sheets

(56) References Cited

U.S. PATENT DOCUMENTS

| | | | |
|---|---|---|---|
| 2016/0134142 A1* | 5/2016 | Murphy | H02J 7/0054 |
| | | | 455/573 |
| 2016/0345628 A1* | 12/2016 | Sabet | A24F 15/18 |
| 2017/0126048 A1* | 5/2017 | Wang | H02J 7/025 |
| 2017/0215293 A1* | 7/2017 | Merenda | H04B 1/3888 |
| 2017/0302324 A1* | 10/2017 | Stanimirovic | H01M 10/46 |
| 2017/0303591 A1* | 10/2017 | Cameron | A24F 47/008 |
| 2018/0131847 A1* | 5/2018 | Kokonaski | H02J 7/0044 |
| 2018/0198298 A1* | 7/2018 | Stanimirovic | H02J 7/0054 |

\* cited by examiner

POWER ADAPTER

CROSS REFERENCE TO RELATED APPLICATIONS

N/A

It will be recognized that some or all of the Figures are schematic representations for purposes of illustration and do not necessarily depict the actual relative sizes or locations of the elements shown. The Figures are provided for the purpose of illustrating one or more embodiments of the invention with the explicit understanding that they will not be used to limit the scope or the meaning of the claims.

DETAILED DESCRIPTION OF THE INVENTION

In the following description, for the purposes of explanation, numerous specific details are set forth in order to provide a thorough understanding of the electronic cigarette of the present invention. It will be apparent, however, to one skilled in the art that the electronic cigarette may be practiced without some of these specific details. Throughout this description, the embodiments and examples shown should be considered as exemplars, rather than as limitations on the electronic cigarette. That is, the following description provides examples, and the accompanying drawings show various examples for the purposes of illustration. However, these examples should not be construed in a limiting sense as they are merely intended to provide examples of the electronic cigarette rather than to provide an exhaustive list of all possible implementations of the electronic cigarette.

Specific embodiments of the invention will now be further described by the following, non-limiting examples which will serve to illustrate various features. The examples are intended merely to facilitate an understanding of ways in which the invention may be practiced and to further enable those of skill in the art to practice the invention. Accordingly, the examples should not be construed as limiting the scope of the invention. In addition, reference throughout this specification to "one embodiment" or "an embodiment" means that a particular feature, structure or characteristic described in connection with the embodiment is included in at 10 least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Figure 1:
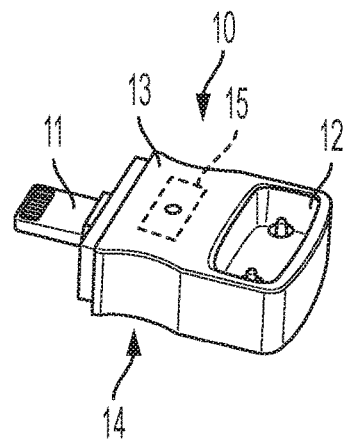
FIG. 1 is a perspective exploded view of the power adapter.
Figure 2:
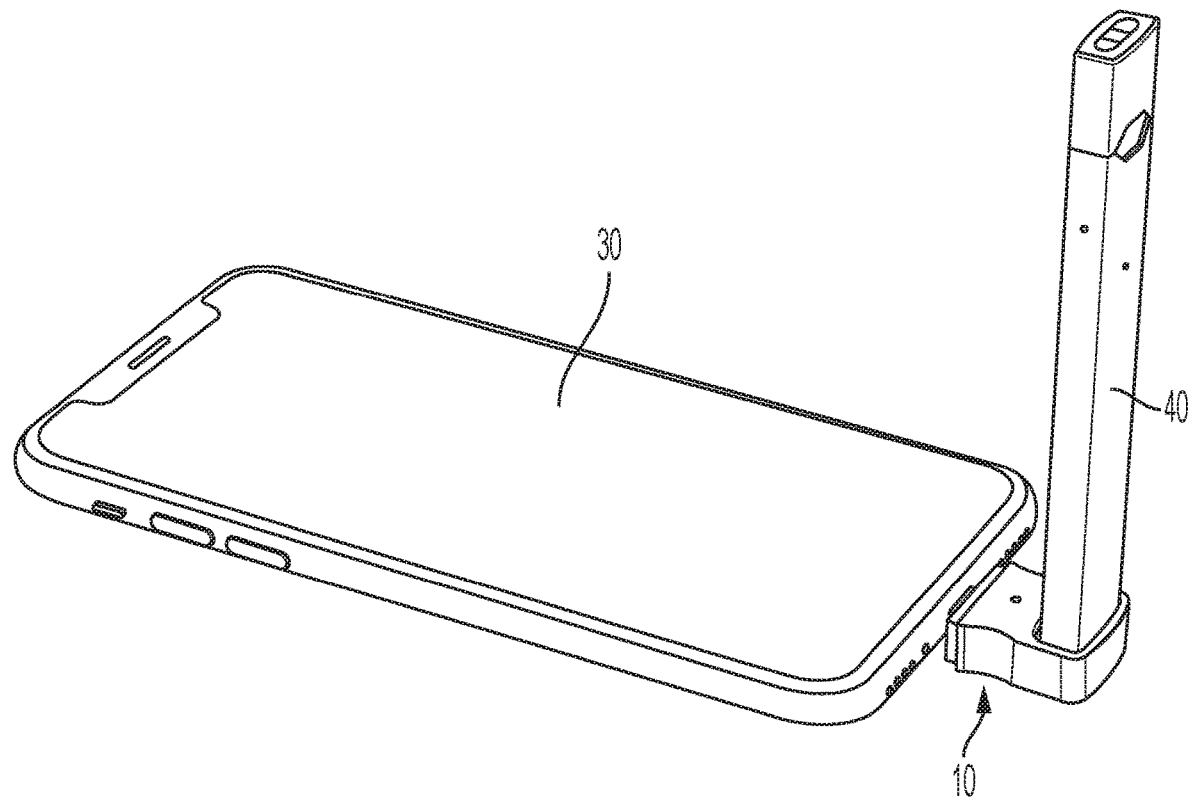
FIG. 2 shows the power adapter connected an exemplary smartphone

Referring to FIGS. 1-2, a power adapter 10 is illustrated. The power adapter comprises a main a first bus connector 11, a second bus connector 12, and a main body 13. In some embodiments, the first and second connectors 11 and 12 are disposed at or adjacent to opposing ends of the main body 13. The main body comprises a housing that, in some embodiments, including bi-lateral curved depressions 14 that facilitate finger placement as further described herein.

The power adapter 10 is configured to draw current from a first external device 30 (see FIG. 2) connected to the first bus connector 11 and pass that current through to the second bus connector 12 such that the second bus connector 12 can pass current to a second external device 40 (see FIG. 2) connected thereto. This permits the second external device 40 to be charged by the first external device 30 through physical and electrical coupling of the two external devices by way of power adapter 10. In some embodiments, data signals can be shared between the two the external devices by way of power adapter 10.

Accordingly, the main body 13 houses an integrated circuit 15 to which the bus connectors 11 and 12 are electrically connected. The integrated circuit 15 is embedded with control logic that controls the current draw by and between the bus connectors 11 and 12. In some embodiments, the current draw is in a single direction, i.e. from first bus connector 11 to the second bus connector 12, or vice-versa. In other embodiments, the current draw is bi-directional. In either embodiment, the logic of the integrated circuit communicates with the external devices to determine current draw capability and needs. The current draw can pass current for charging power sources of the external devices. In some embodiments, the current draw can pass data signals between the two external devices.

The first and second bus connectors 11 and 12 can each comprise a variety of bus types. In some embodiments, either or both connectors 11 and 12 comprise Universal Serial Bus ("USB") connectors such as USB 1.0 Type A, USB 2.0 Type Mini A, USB 2.0 Type Mini B, USB 2.0 Revised Mini A, USB 2.0 Revised Mini B, USB 2.0 Revised Mini AB, USB 2.0 Revised Micro B, USB 2.0 Revised Micro AB, USB 3.0 Type A, USB 3.0 Micro B, USB Micro AB, USB Micro Type C. In some embodiments, either or both connectors 11 and 12 comprise the 8-pin Apple Computers Lightning connector. In some embodiments, either or both connectors 11 and 12 comprises center positive or center negative barrel-type connectors such as 2.1 or 2.5 mm variations thereof. In some embodiments, either or both connectors 11 and 12 comprise connectors used for electronic cigarettes, vaporizers, and like devices including 510 thread, 601 thread, 501 "mod" thread, 601 "mod" thread, and dual-pin-type connectors such as that shown in the exemplary figures herein. It is appreciated and understood that the nature of the logic embedded in the integrated circuit of the main body 13 will be determined at least in part by the type of connectors that are selected. In some embodiments, the first bus connector 11 and second bus connector 12 are of the same bus type. In other embodiments, the first bus connector 11 and second bus connector 12 are of different bus types.

For exemplary purposes only, as shown in FIG. 2, the first external device 30 is a smartphone and the second external device 40 is an electronic smoking device. Power adapter 10 is interconnected between the two devices with the first bus connector 11 connected to a connection port of the smartphone and the second bus connector 12 connected to the electronic smoking device. In some embodiments, power adapter 10 is configured to draw current from the power source, e.g. battery, of the smartphone and pass the current to the power source, e.g. battery, of the electronic smoking device in order to charge same. Thus, power adapter 10 provides a convenient means to charge the battery of one device from the battery of another device without the need for an external power source such as mains electric power. It is appreciated that the current handling capabilities of the power adapter 10 will at least in part be controlled by the selection of connector types and the power control logic that may be contained in the external devices to which the power adapter 10 is connected. Accordingly, the embedded logic of the integrated circuit 15 is in some embodiments configured to communicate with the power control logic of the external devices by way of the respective bus connectors 11 and 12. Accordingly, because the power adapter lacks its own power source, is apparent that the power adapter 10 is passive in that it requires power from at least one of the external devices in order to for the integrated circuit 15 thereof to interface with the external devices to pass power from one device to another. Accordingly, one would appreciate that in such embodiment the external device such as a smartphone is the "host" and the power adapter 10 is the "load" and the electronic smoking device to be charged is the "slave."

Figure 3A:
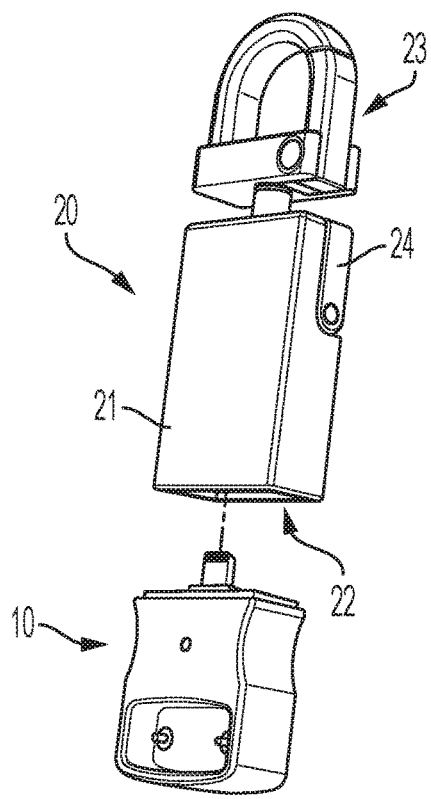
FIG. 3A is a perspective exploded view of the power adapter being inserted into a receptacle.
Figure 3B:
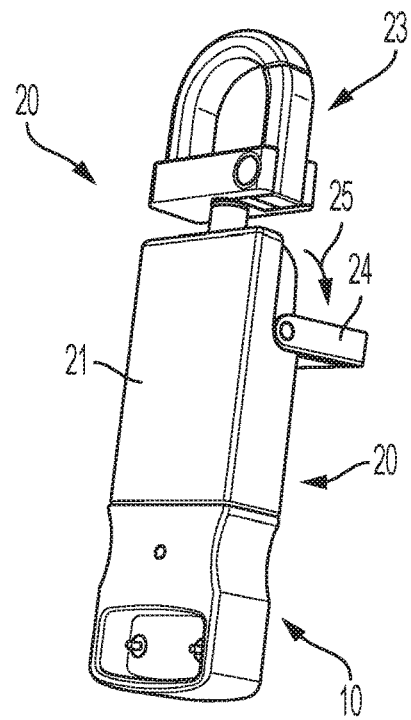
FIG. 3B is a perspective assembled view of the power adapter inserted into the receptacle.

With reference to FIGS. 3A and 3B, the power adapter 10 is configured to be removably received and retained by a receptacle 20. The receptacle 20 comprises a housing 21 that, in some embodiments, is sized and shaped to accommodate at least one end of the power adapter, for example the end at or adjacent to the first bus connector 11. In some embodiments, the power adapter 10 snap fits into opening 22 of the housing 21. Other fitments and connections between the power adapter 10 and the opening 22, such as interference fit, magnetic coupling, press-fit, and the like are contemplated.

Figure 4:
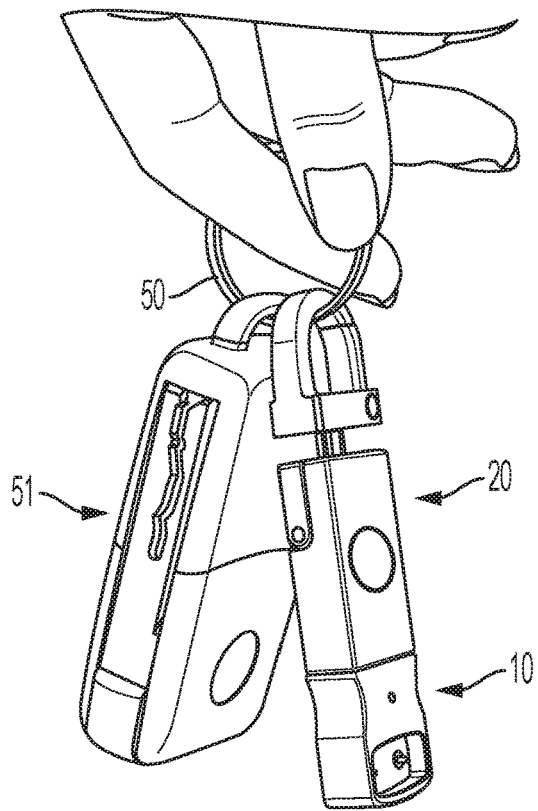
FIG. 4 shows the power adapter and receptacle retained on a keyring.

Optionally, in some embodiments, extending from the housing 21 at the end opposite from the opening 22 is a keyring 23. In some embodiments the keyring 23 is a spring-laded carabiner-type attachment. The keyring 23 facilitates attaching the receptacle 20 to a variety of other structures such as other keyrings, hooks, belt loops, and the like. FIG. 4 shows the receptacle 20 with the power adapter 10 attached thereto with keyring 23 attached to another keyring 50 and a set of keys 51.

Figure 5:
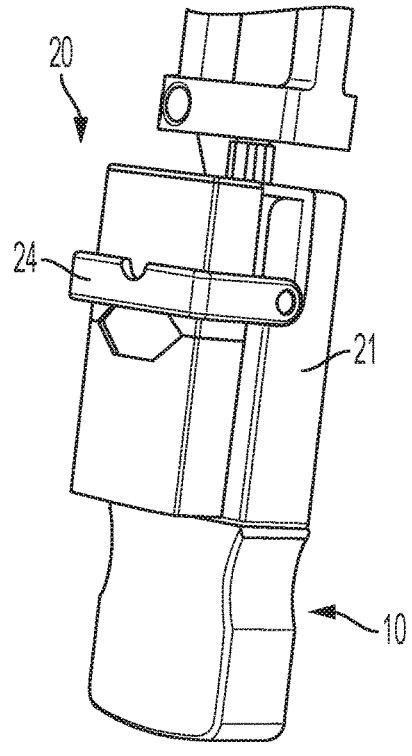
FIG. 5 shows the power adapter and receptacle with a retaining member in an open position to retain an electronic smoking device cartridge.

In some embodiments, receptacle 20 includes a hinged retention member 24 that is configured to articulate from a closed position flush against the side of the housing 21 (FIG. 3A) to a deployed position perpendicular to the housing 21 (FIG. 3B). In the deployed position, the retention member exposes a storage area 25 into which accessories can be inserted and retained by an interference fit against the housing 21. For example, in FIG. 5, a spare electronic smoking device cartridge (e.g. a "vape" cartridge) is inserted into the storage area 25 and retained against the housing 21 by the retention member 24.

Accordingly it can be seen that the present invention provides a convenient and portable multi-function power adapter that can be used to charge or transfer data from one device to another device without the need for mains or other external power sources. It should be appreciated and understood that the power adapter 10 has many possible uses and capabilities depending on the type of connector selected and the types of external devices selected. Accordingly, the uses of power adapter 10 are not limited to the examples shown and described here. It can be used to transfer power and/or data between and among various smartphones, computers, electronic smoking devices, power banks, storage devices, and the like.

It is to be noticed that the term "comprising," used in the claims, should not be interpreted as being limitative to the means listed thereafter. Thus, the scope of the expression "a device comprising means A and B" should not be limited to devices consisting only of components A and B. It means that with respect to the present invention, the only relevant components of the device are A and B. Put differently, the terms "including", "comprising" and variations thereof mean "including but not limited to", unless expressly specified otherwise.

Similarly, it is to be noticed that the term "coupled", also used in the claims, should not be interpreted as being limitative to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means.

The enumerated listing of items does not imply that any or all of the items are mutually exclusive, unless expressly specified otherwise. The terms "a", "an" and "the" mean "one or more", unless expressly specified otherwise.

Elements of the invention that are in communication with each other need not be in continuous communication with each other, unless expressly specified otherwise. In addition, elements of the invention that are in communication with each other may communicate directly or indirectly through one or more other elements or other intermediaries.

One skilled in the art will appreciate that the present invention can be practiced by other than the above-described embodiments, which are presented in this description for purposes of illustration and not of limitation. The specification and drawings are not intended to limit the exclusionary scope of this patent document. It is noted that various equivalents for the particular embodiments discussed in this description may practice the invention as well. That is, while the present invention has been described in conjunction with specific embodiments, it is evident that any alternatives, modifications, permutations and variations will become apparent to those of ordinary skill in the art in light of the foregoing description. Accordingly, it is intended that the present invention embrace all such alternatives, modifications and variations as fall within the scope of the appended claims. The fact that a product, process or method exhibits differences from one or more of the above-described exemplary embodiments does not mean that the product or process is outside the scope (literal scope and/or other legally-recognized scope) of the following claims.

What is claimed is:

1. A power adapter, comprising:
    a main body, a first bus connector, and a second bus connector;
    the first bus connector electrically coupled to the second bus connector by an integrated circuit contained in the main body;
    wherein the power adapter is removably received in a receptacle, the receptacle including a hinged retention member, wherein in at least one deployed position the hinged retention member is substantially perpendicular to a surface of the receptacle;
    wherein the power adapter draws current in only one direction, from an external smartphone and passes the current to an external electronic smoking to charge a power source of the external electronic smoking device;
    wherein the power adapter is passive and does not include a power source;

wherein the integrated circuit is powered by the external smartphone to communicate with the power control logic of the external smartphone such that the external smartphone is a host, the power adapter is a load, and the electronic smoking device is a slave.

2. The power adapter of claim 1, wherein the receptacle includes a carabiner-type key ring.

3. The power adapter of claim 1, wherein the first connector and second connector are of the same bus type.

4. The power adapter of claim 1, wherein the first connector and second connector are of different bus types.

* * * * *